Figure 1:
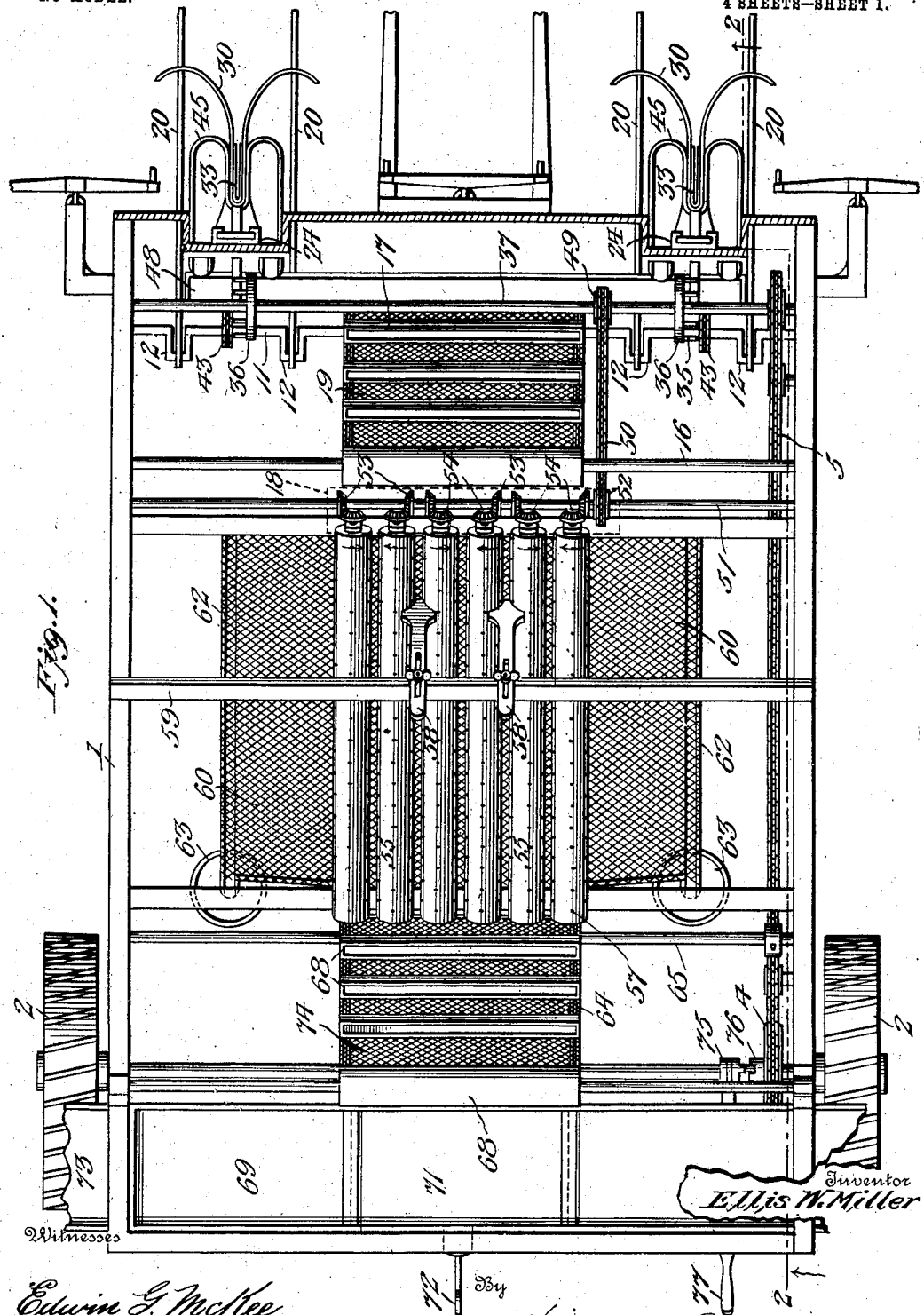

No. 760,899. PATENTED MAY 24, 1904.
E. W. MILLER.
COMBINED CORN STRIPPER AND HUSKER.
APPLICATION FILED MAR. 14, 1903.
NO MODEL. 4 SHEETS—SHEET 1.

Witnesses
Edwin G. McKee
Herbert D. Lawson

Inventor
Ellis W. Miller
By Victor J. Evans
Attorney

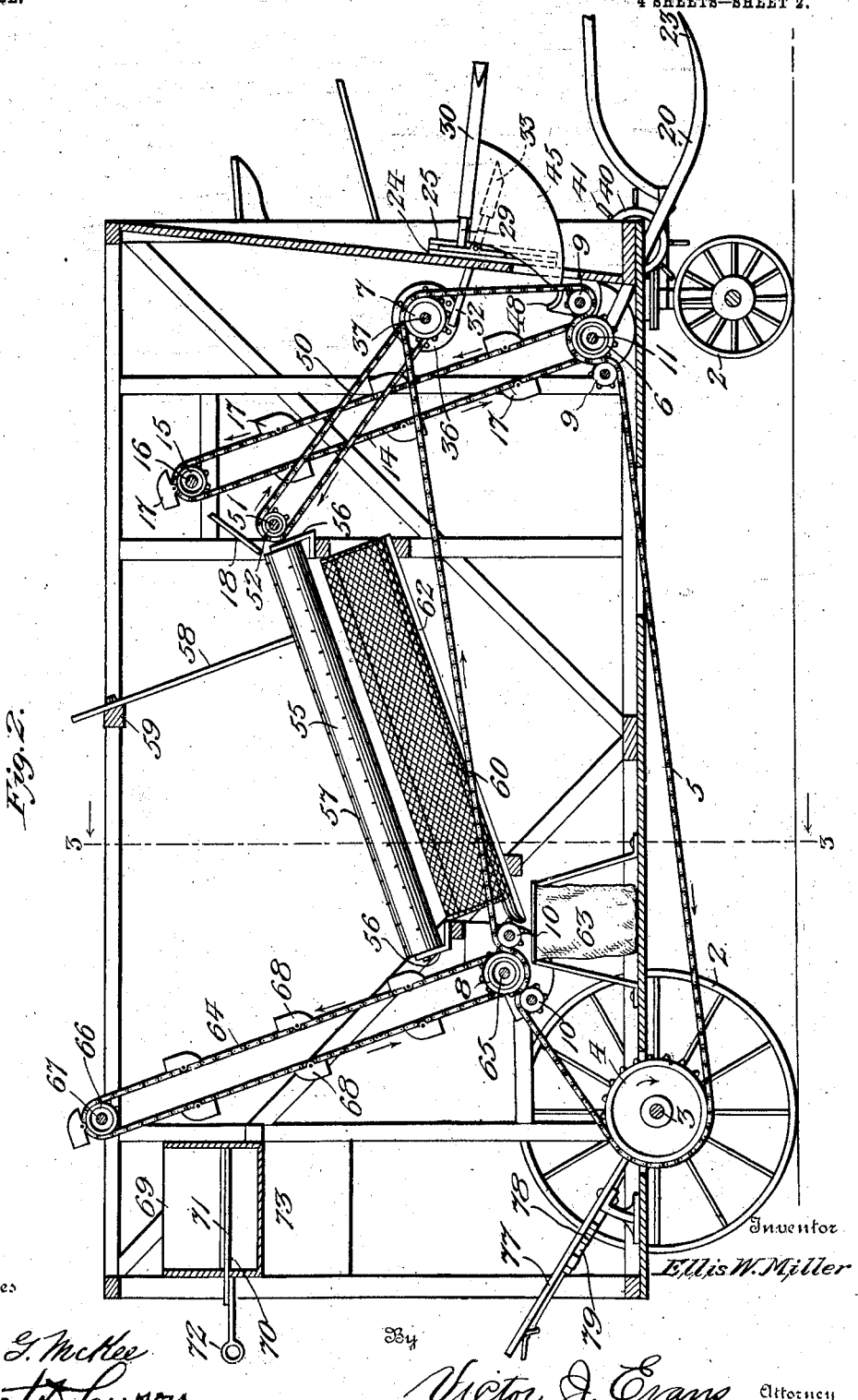

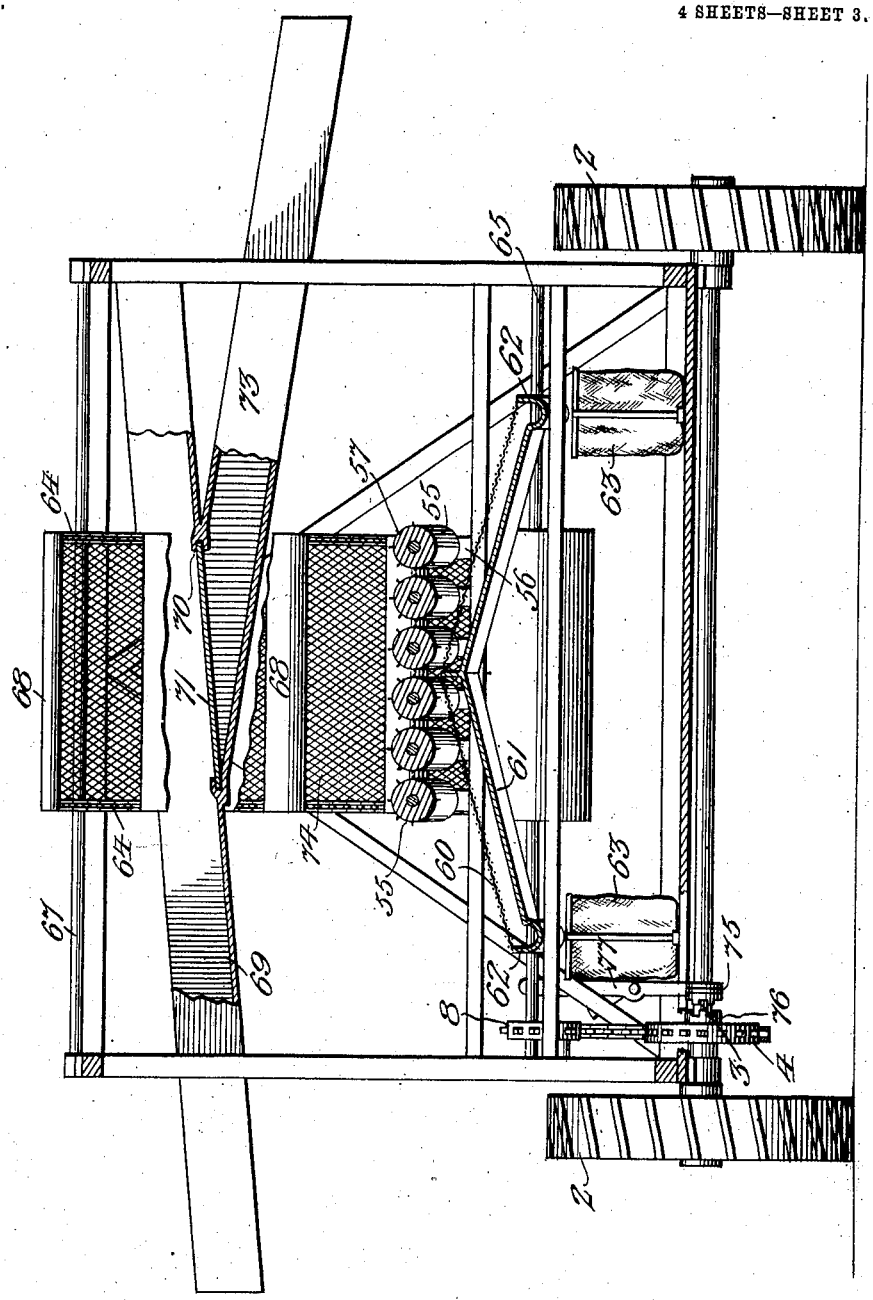

No. 760,899. PATENTED MAY 24, 1904.
E. W. MILLER.
COMBINED CORN STRIPPER AND HUSKER.
APPLICATION FILED MAR. 14, 1903.
NO MODEL. 4 SHEETS—SHEET 4.
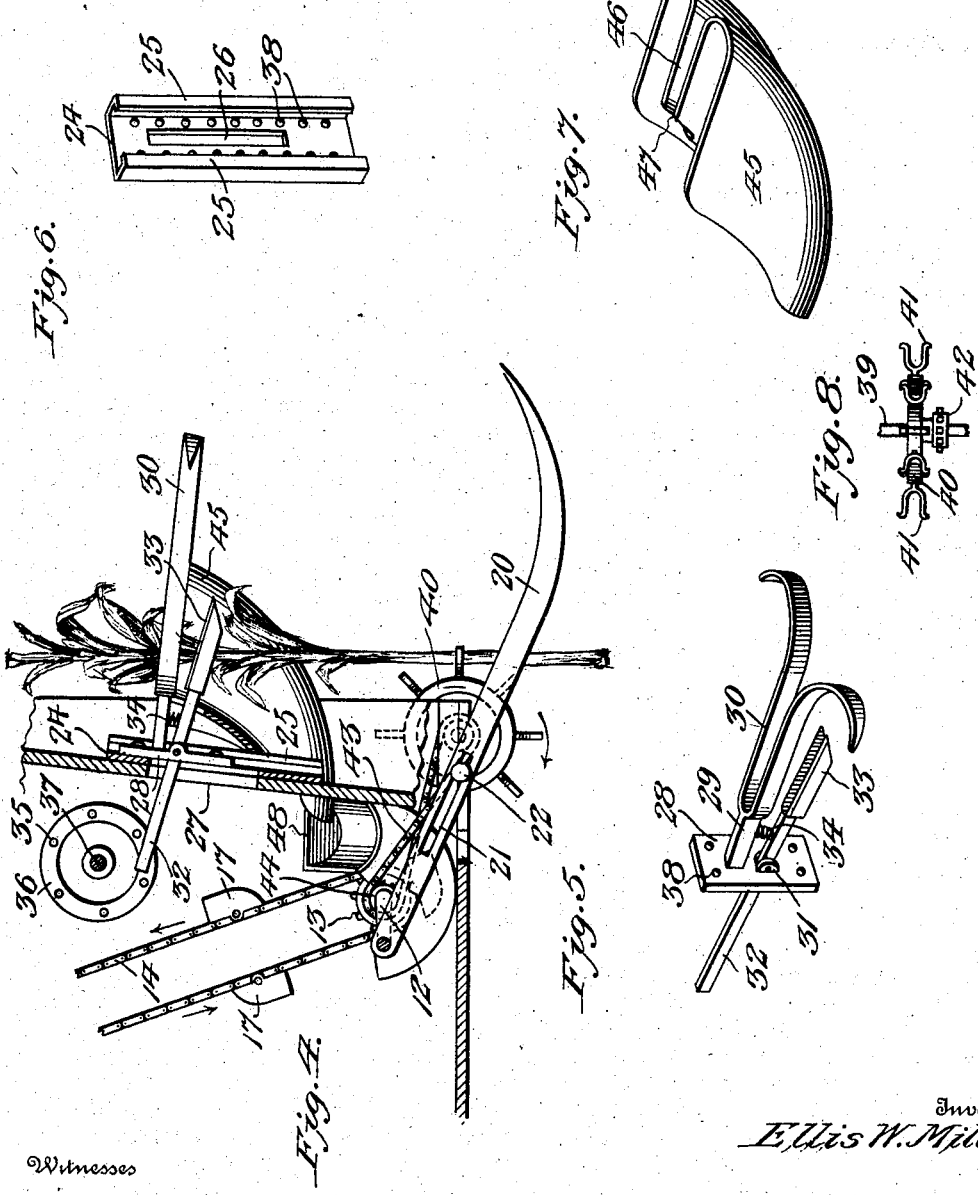

No. 760,899.

Patented May 24, 1904.

UNITED STATES PATENT OFFICE.

ELLIS W. MILLER, OF GREENSBURG, INDIANA, ASSIGNOR OF FIVE-SIXTHS TO WALTER W. BONNER, TRUSTEE, AND PLEASANT H. ANDERSON, OF GREENSBURG, INDIANA.

COMBINED CORN STRIPPER AND HUSKER.

SPECIFICATION forming part of Letters Patent No. 760,899, dated May 24, 1904.

Application filed March 14, 1903. Serial No. 147,830. (No model.)

*To all whom it may concern:*

Be it known that I, ELLIS W. MILLER, a citizen of the United States, residing at Greensburg, in the county of Decatur and State of Indiana, have invented new and useful Improvements in a Combined Corn Stripper and Husker, of which the following is a specification.

My invention relates to new and useful improvements in machines for stripping and husking corn; and its object is to provide mechanism of this character adapted to strip two rows of corn simultaneously and which is provided with mechanism whereby the ears are conveyed automatically to husking devices arranged within the machine.

A further object is to provide means for discharging the husked corn from either side of the apparatus.
A further object is to provide means for raising stalks of corn which are not in an upright position when approached by the machine, and a further object is to provide mechanism whereby the stalks are prevented from being drawn from the ground during the stripping operation.

The invention comprises yokes which extend from the front of the machine and are adapted to grip the stalks of corn and hold them while they are stripped by knives pivoted below and adapted to extend into the yokes. Receivers are provided for the reception of the ears. These receivers serve to guide the ears to an elevator, which conveys them upward to husking-rollers arranged in pairs and adapted to rotate toward each other. These rollers are so constructed and arranged as to tear the husks from the ears, and the husks are adapted to be conveyed to suitable points within the machine, while the grains of corn which may be accidentally separated from the ears are adapted to be screened and deposited within suitable receptacles. An elevator is so located as to receive the husked ears and is employed for carrying them upward to suitably-located chutes, which are so constructed as to enable the corn to be discharged at either side of the apparatus. A rotary wheel having spring-clips upon the periphery thereof is arranged below each stalk-gripping yoke of the machine and is adapted to engage and support the stalks and prevent them from being drawn out of the ground during the stripping operation. Arms are arranged adjacent to these wheels and are so connected as to extend under and raise any stalks which may not be in upright positions.

The invention also consists in the further novel construction and combination of parts hereinafter more fully described and claimed, and illustrated in the accompanying drawings, showing the preferred form of my invention, and in which—

Figure 1 is a plan view of the machine, the front portion thereof being shown in section and the inclined board above the husking-rollers being shown in dotted lines. Fig. 2 is a section on line 2 2, Fig. 1. Fig. 3 is a section on line 3 3, Fig. 2. Fig. 4 is an enlarged section through the stripping and lifting apparatus. Fig. 5 is a detail view of the stalk-engaging yoke and its knife. Fig. 6 is a similar view of the guide for said yoke and knife. Fig. 7 is a detail view of the receiver used in connection with the stripping device, and Fig. 8 is a detail view of the stalk-holding wheel.

Referring to the figures by numerals of reference, 1 is a frame of suitable form mounted upon traction-wheels 2. The axle 3 of the rear wheels has loosely mounted thereon a sprocket 4, upon which is arranged a drive-chain 5, which extends over and serves to rotate a sprocket 6, located at the forward end of the machine adjacent to the bottom thereof. Said chain also extends over a sprocket 7, located above sprocket 6, and thence under a sprocket 8, located adjacent to the rear end of the apparatus at a point near the sprocket 4. Guide-sprockets 9 are arranged at opposite sides of the sprocket 6, so as to hold the chain 5 in engagement therewith, and similar guide-sprockets 10 are located at opposite sides of the sprocket 8 for a similar purpose.

The sprocket 6 is secured upon a shaft 11, which extends transversely of the machine and has preferably four cranks 12 thereon.

Sprockets 13 are arranged upon the crank-shaft near the center thereof, and chains 14 extend thereover and over sprockets 15, which are mounted on a shaft 16, extending transversely of the machine near the top thereof. Buckets 17 connect the two chains 14 and are pivoted thereto and are adapted to discharge any material which may be in position therein upon an inclined board 18, located adjacent to the upper sprockets 15. A screen 19 also connects chains 14, so as to prevent any material from falling between said chains during the operation of the elevator.

To each of the cranks 12 is pivoted a lever 20, having a longitudinally-extending slot 21 therein which receives a guide-pin 22, arranged upon the front of the machine. It is obvious that as shaft 11 rotates the cranks 12 the levers 20 will be automatically moved forward and swung upward. The forward ends of these levers are curved and pointed, as shown at 23, for the purpose hereinafter more fully described. Arranged above and between each pair of levers 20 is a guide-plate 24, having inwardly-extending flanges 25 at the sides thereof. This plate has a longitudinally-extending slot 26, which registers with a similar slot 27, formed within the front of the machine. A plate 28 is adjustably secured upon the guide-plate, and between the flanges and extending forward from this plate is a shank 29, having a yoke 30 formed of oppositely-extending curved spring-arms. Ears 31 are arranged below the shank, and a lever 32 is pivoted therebetween and has parallel knives 33 at the front end thereof. A coiled spring 34 is interposed between the lever 32 and the shank 29, so as to hold the knives normally removed from the yoke 30. Lever 32 projects through the slots 26 and 27 and is adapted to be contacted successively by pins 35, which extend laterally from a disk 36, arranged upon the shaft 37 of sprocket 7. It will be understood that as the disk 36 rotates the pins upon coming into contact with lever 32 will impart an oscillating movement to the knives 33 and cause them to quickly move in and out of the yoke 30. Any suitable means may be employed for adjustably securing the plate 28 within guide 24. In the drawings I have shown apertures 38, which are adapted to receive suitable locking-bolts for holding the plate in position.

Between each pair of levers 20 is journaled a small shaft 39, having a wheel 40 thereon, above the periphery of which extend spring-clips 41. Sprocket-wheels 42 rotate with the shaft 39 and are driven by chains 43, which pass over sprockets 44, suitably located upon the shaft 11, before referred to. These chains and sprockets are so arranged as to rotate the wheels 40 in the direction of the arrow in Fig. 4, and the clips are adapted to engage the stalks of the corn and draw them downward during the operation of the stripping-knives 33. By means of this device the corn is prevented from being drawn from the ground by the apparatus.

Suitably secured to each yoke 30 is a receiver 45, preferably formed of sheet metal and having a U-shaped recess 46 in the center thereof which is adapted to inclose the yoke and be fastened thereto. A slot 47 is formed at the inner end of this recess to receive the shank 29 of the yoke. The bottom of the receiver is curved downwardly and rearwardly and projects through the front of the machine at a point above an inclined chute 48. This chute serves to guide the material discharged thereinto toward the center of the front of the apparatus and to a position in the path of the buckets 17.

A sprocket 49 is located on the shaft 37, and motion is transmitted therefrom by a chain 50 to a shaft 51, arranged below the inclined board 18 and having a sprocket-wheel 52, upon which the chain 50 is arranged. Preferably three pairs of oppositely-disposed beveled gears 53 are located on the shaft 51, and each of these gears meshes with a smaller gear 54, secured to the upper end of one of a series of parallel inclined husking-rollers 55. These rollers are journaled in suitable brackets 56, arranged within the frame, and have teeth or projections 57, which extend from the surfaces thereof at suitable distances from each other. By means of the novel arrangement of gears the rollers are adapted to rotate toward each other in pairs, as indicated by arrows in Fig. 1, and stops 58 project downward between the pairs of rollers and serve to prevent the corn from slipping down upon the inclined rollers prior to the husking operation. These stops are adjustably mounted upon a cross-beam 59, as clearly illustrated in Fig. 1. A screen 60 is arranged below the rollers and is inclined toward the opposite sides of the machine. Under this screen is located a board 61, inclined from the center toward the sides and having a gutter 62 at each side thereof for directing into suitable receptacles 63 any grains of corn or other particles which may pass through the screen 60.

Sprocket-chains 64 are adapted to be driven by the shaft 65 of sprocket 8, and these chains extend upward and over sprockets 66, arranged upon a shaft 67, which is preferably journaled at the top of the machine and near the rear end thereof. Buckets 68 are pivoted to these chains and are adapted to receive the ears as they are discharged from the inclined rollers 55. Arranged below the shaft 67 is a chute 69, which is inclined downwardly and projects from one side of the machine. An aperture 70 is arranged in the bottom of this chute at a point directly under that portion of shaft 67 upon which the chains 64 are mounted, and this aperture is normally closed by means of a slide 71, having an operating handle or arm 72, which projects from the rear end of the machine. Arranged below the aperture 70 is a chute 73, which is inclined downwardly and extends from the other side of the apparatus. In order to prevent material from falling between the buckets 68 and the chains 64, a netting 74, of wire or other suitable material, is fastened to said chains.

A sleeve 75 is keyed to but slidably mounted upon the axle 3 of the machine and is adapted to be shifted into engagement with a toothed collar 76, extending from the sprocket 4. This sleeve is shifted in any suitable manner, as by means of a lever 77, having a toothed segment 78, which is adapted to be engaged by a spring-pressed pawl 79 of the ordinary construction and arrangement.

When it is desired to operate the machine, the sleeve 75 is moved into engagement with collar 76, and sprocket 4 is thus caused to rotate with the traction-wheels, and all of the shafts within the machine rotate in unison. The yokes 30 are spaced apart a distance equal to the distance between the rows of corn, and it is obvious that as the machine is drawn forward two rows of corn will be received by the yokes. Any stalks which are not in upright positions may be promptly raised into the paths of the yokes by the levers 20, which are projected forward and then swung upward by the cranks 12. The stalks are engaged also by the spring-clips 41, which prevent the same from being drawn from the ground while an upward pull is being exerted thereon by the yokes 30. These yokes grasp the stalks successively and incline them forward, and during this operation the knives 33 rapidly reciprocate back and forth and strip the corn. The ears will fall to opposite sides of the yokes into the receivers 45, and said receivers will guide them downward into the inclined chute 48, by which they will be guided to points in the path of the buckets 17. These buckets will carry the corn upward and discharge it upon inclined board 18, and it will then be deposited on the rollers 55. As these rollers rotate toward each other in pairs, it is obvious that the ears will be directed toward the passes therebetween. As these passes, however, are not sufficiently wide to permit the ears to travel therethrough, it is obvious that the projections or teeth 57 will tear the husks and separate them from the ears. As the rollers revolve the corn will gradually move downward upon them, while the husks will be carried through the passes and deposited upon screens 60, which will discharge them from the machine at the sides thereof. Any grains of corn which may have been separated by contact with the teeth will pass through screen 60 upon the board 61 and will be guided by said board to the gutter 62 and receptacles 63. The corn will be discharged from the lower ends of rollers 55 into the buckets 68 and are carried thereby upward to a point above the chute 69, into which they are discharged. If the slide 71 is in closed position, chute 69 will conduct the corn to one side of the apparatus; but if said slide is removed the corn will fall directly through aperture 70 and into chute 73, which will conduct it to the other side of the machine. By providing the stops 58 any corn which may fall between the pairs of rollers 55 will be prevented from sliding off of said rollers prior to the removal of the husks, for the reason that the stops will force them to move laterally into position within the passes between the rollers of the adjacent pair.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In an apparatus of the character described, the combination with a spring-yoke having a receiver thereunder; of a spring-pressed knife under, and adapted to project into, the yoke, and means for oscillating the knife.

2. In an apparatus of the character described, the combination with a spring-yoke having oppositely-extending arms; of a receiver at opposite sides of the yoke, a knife under, and adapted to project into, the yoke, and means for oscillating the knife.

3. In an apparatus of the character described, the combination with a shank, and a yoke extending therefrom comprising oppositely-curved spring-arms; of a receiver secured to, and arranged at opposite sides of, the yoke, parallel knives under, and adapted to project into, the yoke, and means for oscillating the knives.

4. In an apparatus of the character described, the combination with a yoke consisting of oppositely-curved spring-arms; of a receiver at opposite sides of the yoke, a reciprocating knife adapted to project into the yoke, a chute for receiving material from the receivers, and elevator-buckets adapted to alternately remove material from the receiver.

5. In an apparatus of the character described, the combination with a yoke, a receiver thereunder, and reciprocating knives adapted to project into the yoke; of a shaft having a crank thereon, a lever connected to the crank, and a guide for the lever.

6. In an apparatus of the character described, the combination with a yoke having a receiver thereunder, and a reciprocating knife adapted to project into the yoke; of a rotary shaft having a crank thereon, a longitudinally-slotted lever connected thereto and adapted to raise stalks into the path of the yoke, and a guide-pin projecting into the slot in the lever.

7. In an apparatus of the character described, the combination with a guide; of a plate adjustably secured thereto, a yoke extending from the plate, cutting-knives under, and adapted to project into the yoke, means for imparting reciprocating movement to the knives, a receiver below the yoke, a chute adapted to receive material from the receiver, a rotary shaft, elevator-buckets operated thereby, a crank integral with the shaft, a longitudinally-slotted lever connected to the crank and adapted to raise stalks into the path of the yoke, and a guide-pin projecting through the slot.

8. In an apparatus of the character described, the combination with a yoke having a receiver thereunder, and a reciprocating knife under, and adapted to project into, the yoke; of a wheel journaled below the yoke, stalk-holding clips extending from the periphery of the wheel, and means for rotating said wheel.

9. In an apparatus of the character described, the combination with a yoke having a receiver thereunder, and reciprocating knives adapted to project into the yoke; of a rotary shaft having a crank thereon, a lever connected to the crank, a guide to the lever, a wheel, stalk-engaging clips projecting therefrom, and means for rotating the wheel.

10. In an apparatus of the character described, the combination with a yoke having a receiver thereunder, and reciprocating knives projecting into the yoke; of elevating-buckets for hoisting material from the receiver, inclined pairs of rollers journaled adjacent to the buckets, teeth upon the rollers, and means for rotating the rollers of each pair in opposite directions.

In testimony whereof I affix my signature in presence of two witnesses.

ELLIS W. MILLER.

Witnesses:
HARVEY K. SMILEY,
PLEASANT HAMLIN ANDERSON.